United States Patent [19]
McShirley

[11] 3,738,177
[45] June 12, 1973

[54] APPARATUS FOR DISPENSING A MEASURED VOLUME OF A DENTAL RESIN REAGENT

[76] Inventor: Robert C. McShirley, 917 Verdugo Circle Drive, Glendale, Calif. 91201

[22] Filed: Apr. 17, 1972

[21] Appl. No.: 244,710

[52] U.S. Cl.................... 73/429, 222/291, 222/381
[51] Int. Cl............................................. B21j 9/00
[58] Field of Search .................... 73/429, 427, 428; 222/286, 260, 291, 381, 386, 390, 501, 419, 420, 421, 548, 287, 309, 328; 425/352–355

[56] References Cited
UNITED STATES PATENTS

| | | |
|---|---|---|
| 1,181,206 | 5/1916 | Basehore et al. .................... 73/429 |
| 2,017,140 | 10/1935 | Worth.................................. 222/521 |
| 3,199,749 | 8/1965 | Driscoll............................... 222/520 |
| 3,326,049 | 6/1967 | Eley ...................................... 73/429 |

Primary Examiner—Robert B. Reeves
Assistant Examiner—Larry Martin
Attorney—Theodore B. Roessel

[57] ABSTRACT

Disclosed is a device for metering measured amounts of dental restorative resin. The device includes a cylinder and a hub arranged so that rotation of the cylinder on the hub moves the members axially a known amount to create an opening in the end surface of the cylinder. After the opening is filled with the resin, the members are rotated back, which causes the hub to push the material from the opening up to the level of the end surface of the cylinder.

4 Claims, 5 Drawing Figures

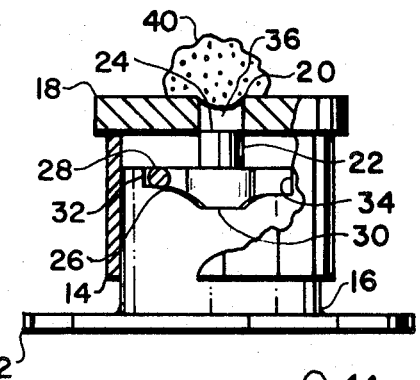
FIG. 2
FIG. 1
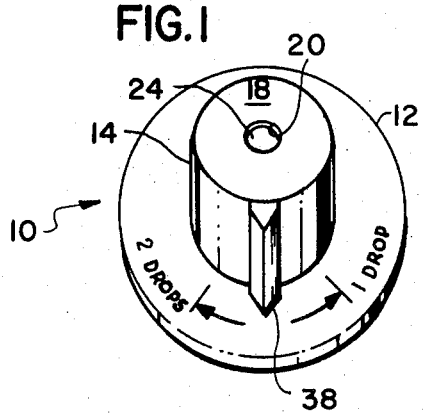
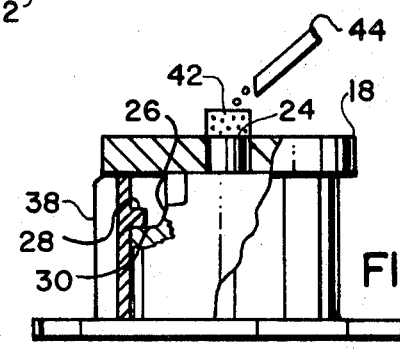
FIG. 3
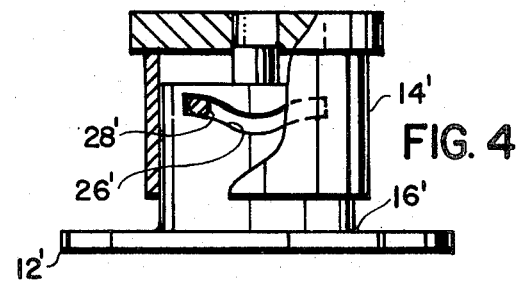
FIG. 4
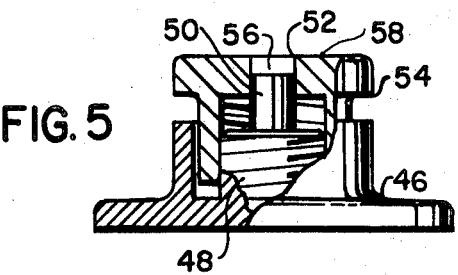
FIG. 5

APPARATUS FOR DISPENSING A MEASURED VOLUME OF A DENTAL RESIN REAGENT

BACKGROUND OF THE INVENTION

The present invention relates generally to a device for presenting a measured volume of resin material to a flat mixing surface. The device may be used by dentist and the like for metering measured amounts of dental restorative polymeric material.

The reagents used in making polymeric dental restorations are kept separate, as in the case of amalgams using silver and mercury, in order to prevent a premature reaction between the reagents. The major components of the polymeric or resinous restoration is furnished to the dentist as a sticky paste-like moldable resin material. The second component is a catalyst, which, when added to and mixed with the paste material, causes a reaction resulting in a "setting up" or hardening. In order to obtain a proper mix both the reagents must be accurately measured.

The catalyst, or secondary reagent, usually being in liquid form, can be dispensed from its container in drops. The problem results in attempting to obtain measured volumes of the pasty resin material. The usual practice is to package this pasty resin material in individual dosages, with each dose representing an amount sufficient to make one dental restoration. It should be appreciated that it is not entirely suitable to have on hand a large number of small packages of the material, and, further, packaging in this manner makes it difficult for the dentist to dispense, say, one-half or one-quarter of the packaged amount in order to form a small or partial restoration.

If the material is furnished in bulk form, the dentist is presented with the problem of accurately measuring out the desired volume of material from the bulk container. The present invention, however, provides the dentist with a simple, inexpensive device for metering out measured volumes of the pasty reagent from a bulk container.

SUMMARY OF THE INVENTION

The present invention may be characterized in one aspect thereof, by an upright cylinder with a flat upper surface having an opening therethrough, a hub on which the cylinder rotates, the hub having an axial portion extending through the opening with the end surface of the axial portion normally being flush with the cylinder surface; and means between the hub and cylinder for inducing relative axial movement when the cylinder is rotated on the hub. Rotation of the cylinder in one direction causes the end surface of the hub to drop below the cylinder surface a known amount forming, together with the opening, a chamber of known volume. The chamber is then filled level with the pasty dental resin material and the cylinder rotated in the opposite direction. This returns the end surface of the hub flush with the cylinder surface, to present a plug of known volume of the material to the cylinder surface for mixing with the catalyst.

OBJECTS OF THE PRESENT INVENTION

It is an object of the present invention to provide a device for metering accurately measured volumes of pasty resinous reagents used in the preparation of dental restorations.

Another object of the present invention is to provide a device which has a surface for mixing dental restorative reagents including means for presenting to the surface a measured quantity of one of the reagents.

A further object of the present invention is to provide a device of the type described in which either of two measured volumes of the pasty reagents may be selectively presented to the mixing surface.

A still further object of the present invention is to provide an inexpensive, easily used device for presenting measured volumes of pasty viscous material in single doses to a mixing surface.

These and other objects, advantages and characterizing features of the present invention will become more apparent upon consideration of the following detailed description thereof, when taken in connection with the accompanying drawings depicting the same.

DESCRIPTION OF THE DRAWINGS

FIG. 1 is a perspective view of the device of the present invention;

FIG. 2 is a front elevation view, partly broken away and in section, showing the device in one operative position;

FIG. 3 is a side elevation view, similar to FIG. 2, showing the device in another operative position; and FIGS. 4 and 5 are views similar to FIG. 2 showing two other embodiments of the invention.

DESCRIPTION OF THE PREFERRED EMBODIMENTS

Referring to the drawings, FIG. 1 shows the device 10 of the present invention to include a base portion 12 and an upstanding collar member or cylinder 14. The cylinder is rotatable clockwise and counterclockwise with respect to the base for purposes set out hereinbelow. The upper surface 18 of the cylinder is a flat mixing surface having a central opening 20.

As shown in FIG. 2, cylinder 14 is rotatable about a hub 16 which upstands from base 12. The top of the hub carries an axially extending piston or plug 22 which just fits into opening 20. Normally, the end surface 24 of the piston is flush with the top mixing surface 18 of the cylinder, as shown in FIGS. 1 and 3.

Formed in the upper surface of the hub 16 about a portion of the hub periphery is a cam track 26. A cam follower 28 is fixed to the inner wall of cylinder 14 and rides on the cam track. The configuration of the cam track allows basically three positions of the cylinder with respect to the base. In the intermediate or mixing position shown in FIGS. 1 and 3, the cylinder is against the base, so that the end surface 24 of the piston is flush with mixing surface 18. Here, cam follower 28 is at the low point 30 of the cam. As the cylinder is rotated with respect to the base, say clockwise, as viewed in the Figures, cam follower 28 will follow along cam track 26 to a high end 32 of the track. Rotation is limited by abutment of the cam follower against the end of the track. As the cam follower moves along the track to end 32, the cylinder is moved axially with respect to the base and hub to the position shown in FIG. 2. Conversely, if the cylinder is rotated counterclockwise as viewed in the Figures, the cam follower will move to the other, lower end 34 of the cam track.

The throw of the cam, that is the distance from the mixing position 30 of the cam track to either of its end points 32 or 34 is a known distance. Since the diameter of opening 20 is also known, it should be appreciated that rotating the cylinder so as to move the cam follower to the position shown in FIG. 2 will create a chamber 36 of known volume in the top of the cylinder. The volume of this chamber is known, because its diameter and height are known. Conversely, rotating the cylinder in the opposite direction will create a chamber of a lesser known volume.

Any suitable means such as a pointer 38 shown in FIG. 1 together with appropriate indicia on base 12 can be used to indicate which direction to rotate cylinder 14 for the large or small volumes and the number of drops of catalyst reagent which should be added for a proper mix.

In operation, a bulk unmeasured quantity of a pasty resinous dental reagent 40 is placed on the mixing surface 18 of the cylinder and the cylinder rotated clockwise and counterclockwise depending upon whether a greater of a lesser measured amount of reagent is desired (FIG. 2). Rotating the cylinder causes cam follower 28 to move along cam track 26, driving the cylinder axially and creating chamber 36. The paste is then simply moved into the chamber with any suitable means, such as a plastic spatula (not shown). The chamber is overfilled and the spatula run across surface 18 to remove the excess. Now, the cylinder is pushed towards base 12 and rotated back to the "mixing" position, so as to locate cam follower 28 at the low point of the cam track, as shown in FIG. 3. Movement of the cylinder back against base 12 causes piston 22 to force a plug 42 of the pasty reagent from chamber 36 and up to the level of mixing surface 18. Since the volume of this plug 42 is known, the correct amount of the catalyst reagent can then be added by any suitable means, such as an eye dropper 44 and the two reagents mixed together with the plastic spatula on surface 18.

Preferably, the cylinder or at least its upper surface 18, and piston 22 are made of a non-sticking material, such as tetrafluoroethylene.

In the embodiment of FIG. 4 the cam follower 28' is captured in a cam track 26' formed about a portion of the periphery of hub 16'. The operation of this embodiment is the same as the previously described embodiment, with one exception. Since cam follower 28' is captured in the cam track, turning cylinder 14' will automatically drive the cylinder axially with respect to base 12' so that there is no need to push the cylinder towards the base as is the case with the embodiment shown in FIGS. 2 and 3.

The embodiment of FIG. 5 operates on a screw principle. Here a base member 46 has an upstanding, threaded stud 48. Extending axially from the stud is a piston member 50. The piston extends into an opening 52 formed in a cylinder member 54 which is threadably mated to stud 48. In this embodiment rotation of the cylinder will move it along the stud to create a chamber 56 which can be filled with the pasty reagent (not shown). Rotation in the opposite direction results in the piston clearing the chamber and presenting a measured plug of the reagent on the mixing surface 58 of the cylinder. With the pitch of stud 48 and diameter of the opening being known, it should be appreciated that chamber 56 can be set at the desired volume simply by rotating cylinder 54 an appropriate amount.

Thus, it should be appreciated that the present invention accomplishes its intended objects, providing a simple dispensing device for delivering a measured volume of pasty reagent to a mixing surface on the device. The device is simple to operate, inexpensive to manufacture, and is capable of dispensing accurately measured volumes of the pasty reagent.

Having thus described the invention in detail, what is claimed as new is:

1. Apparatus for presenting a measured volume of a moldable, pasty dental resin reagent to a mixing surface where the reagent is mixed with a catalyst, said apparatus comprising:
   a. a base member;
   b. a hub upstanding from said base;
   c. a piston with a flat end surface extending axially from said hub;
   d. a collar rotatable about said upstanding hub, an end surface of said collar being a mixing surface with an opening therethrough slidably receiving said piston;
   e. means for driving said collar axially with respect to said hub when said collar is rotated including a cam track formed about the periphery of said hub and a cam follower carried by said collar and engaging said cam track, said collar being movable between a first mixing position and a second load position;
   f. said collar in said second position being spaced from said base to locate the end surface of said piston in said opening below the level of the mixing surface, said piston end surface and said opening together defining a chamber of known volume for receiving the pasty dental resin reagent; and
   g. said collar in said first position being adjacent said base to locate the end surface of said piston in said opening flush with said mixing surface, said collar movement causing said piston to slide through said opening and sweep pasty dental resin reagent from said chamber to present the reagent therein to said mixing surface.

2. Apparatus as set forth in claim 1, wherein said cam track has two end positions and an intermediate position, said cam follower at said intermediate position locating said hub end surface flush with said mixing surface and said cam follower at either of said end positions locating said hub end surface in said bore below said mixing surface.

3. Apparatus as set forth in claim 2, wherein the throw of said cam track from said intermediate position to one end position is larger than the throw from the intermediate position to the other end position whereby the volume of said chamber can be adjusted to either of two known volumes by rotating said collar clockwise or counterclockwise on said hub.

4. Apparatus as set forth in claim 1, wherein said cam track is formed about the periphery of said hub wholly below said mixing surface, said cam follower being captured in said cam track to move said collar towards or away from said base as said collar is rotated clockwise or counterclockwise.

* * * * *